United States Patent
Peterson et al.

[15] 3,659,716
[45] May 2, 1972

[54] FILTER ASSEMBLY WITH FILTRATE FLOW CONTROL AND CONTROL COMPONENTS

[72] Inventors: C. Lynn Peterson; Clarence John Peterson, both of Salt Lake City, Utah

[73] Assignee: Peterson Filters & Engineering Company, Salt Lake City, Utah

[22] Filed: Oct. 6, 1969

[21] Appl. No.: 863,947

[52] U.S. Cl. ...................... 210/247, 210/331, 210/347
[51] Int. Cl. ........................ B01d 33/40, B01d 33/26
[58] Field of Search ............. 210/247, 331, 330, 347, 402

[56] References Cited

UNITED STATES PATENTS

| | | | |
|---|---|---|---|
| 1,848,445 | 3/1932 | Vallez | 210/331 |
| 2,207,618 | 7/1940 | Grill et al. | 210/331 X |
| 2,932,402 | 4/1960 | Logue et al. | 210/347 X |
| 1,705,226 | 3/1929 | Hutz | 210/402 |

FOREIGN PATENTS OR APPLICATIONS 1,009,952  11/1965  Great Britain.........................210/331

*Primary Examiner*—Frank A. Spear, Jr.
*Attorney*—McGrew and Edwards

[57] ABSTRACT

Disc filter assembly in which a plurality of filter discs are mounted on common shaft for rotation to selectively dispose disc surfaces under vacuum in a confined body of slurry through a portion of said rotation and to discharge formed cake from said surfaces by "blow" action through another portion of rotation. Each disc has plurality of sectors in sequential arrangement circumferentially of shaft mounted on a hollow center shaft fabricated from standard industrial components, inclusive of steel pipe forming shaft exterior and plurality of tubular members of oblong section in welded circumferentially spaced arrangement interiorly of pipe providing a conductive passage in communicating relation to at least one sector for applying vacuum and blow thereto under control of filter valve.

12 Claims, 14 Drawing Figures

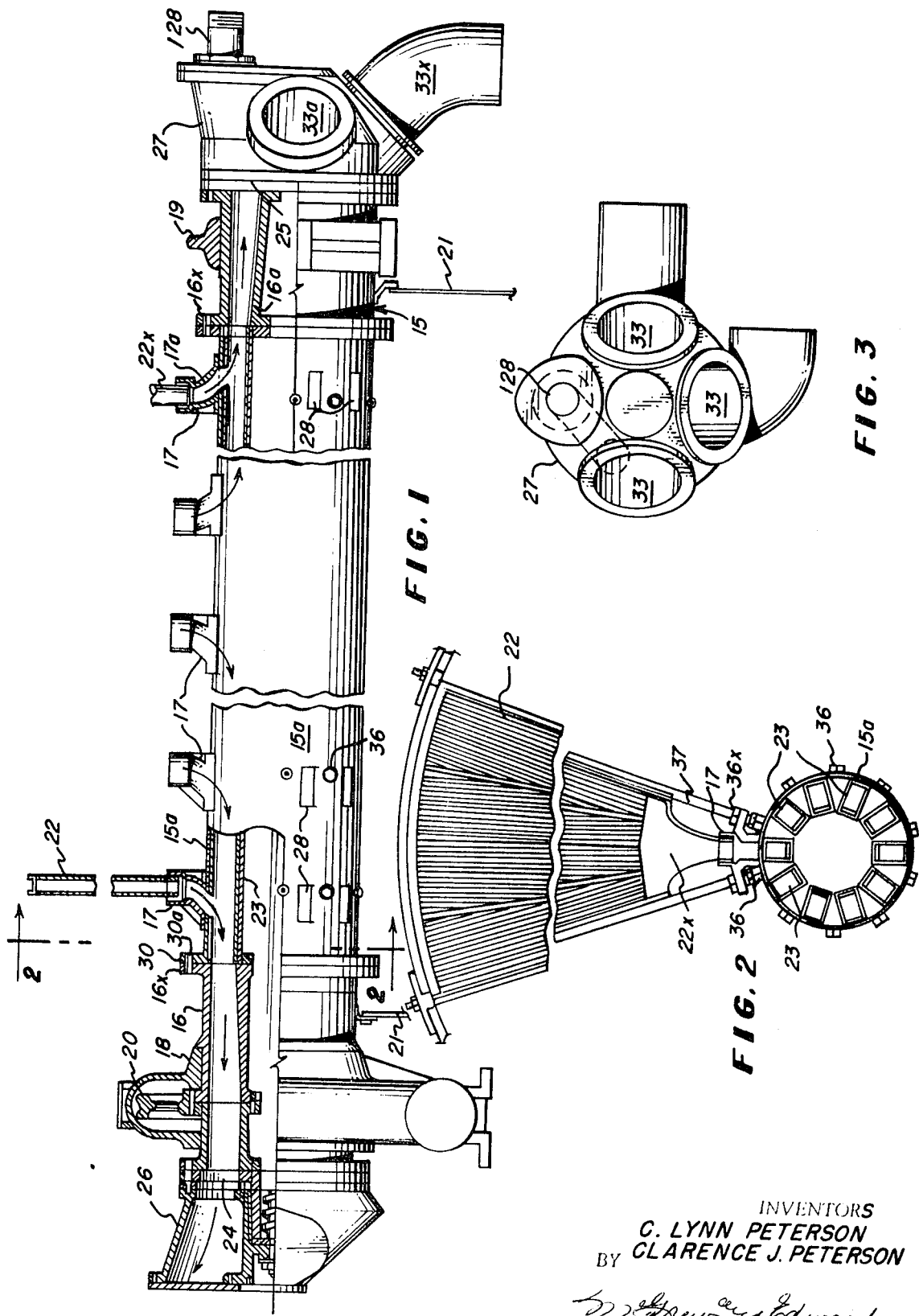

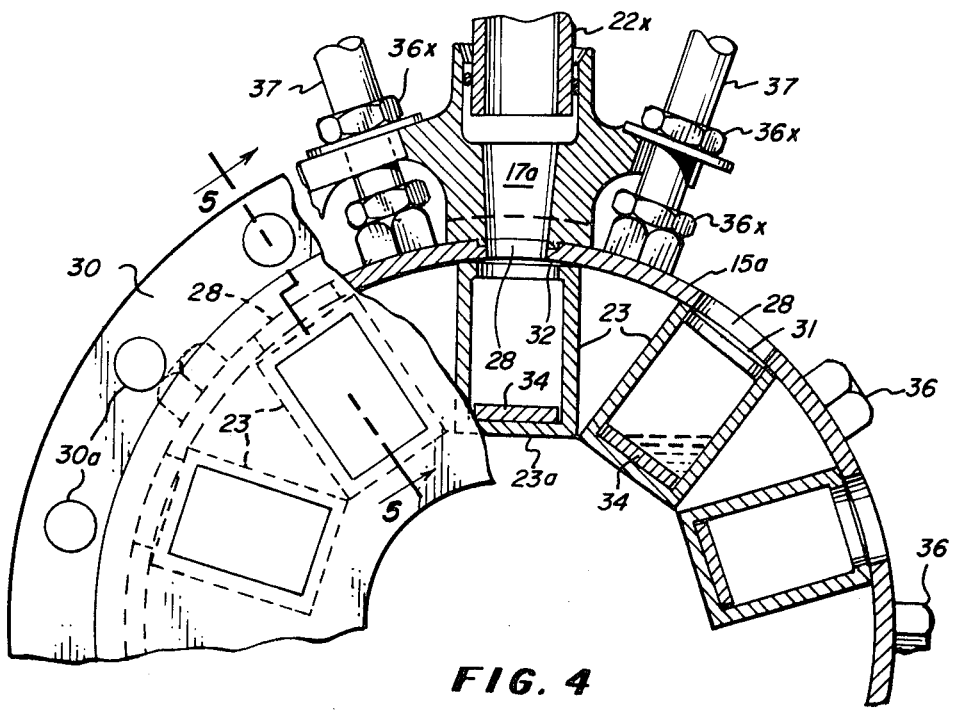
FIG. 4
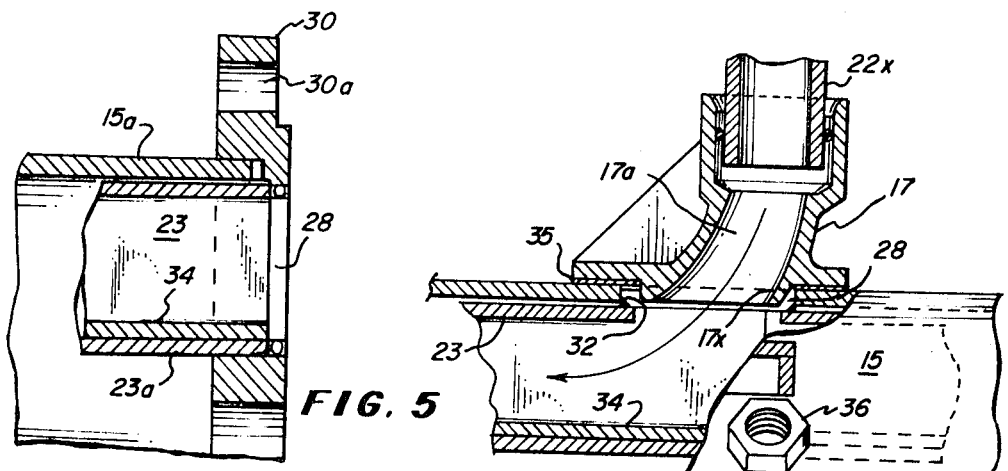
FIG. 5
FIG. 6
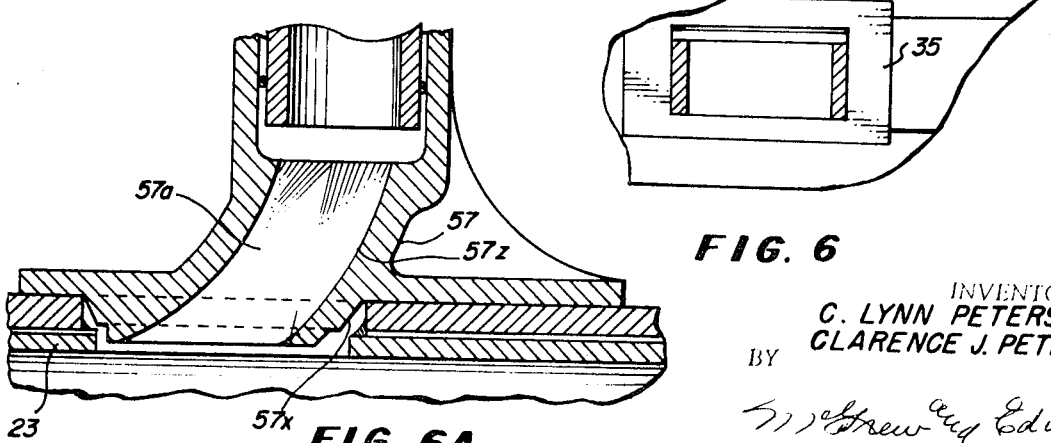
FIG. 6A
INVENTORS
C. LYNN PETERSON
CLARENCE J. PETERSON
BY
McGrew and Edwards
ATTORNEYS Patented May 2, 1972

INVENTORS
C. LYNN PETERSON
CLARENCE J. PETERSON
BY
ATTORNEYS

FILTER ASSEMBLY WITH FILTRATE FLOW CONTROL AND CONTROL COMPONENTS

This invention relates to disc filter construction and more particularly relates to the center shaft assembly of such a filter. The invention also relates to a novel type of connector defining a passage between a sector bell and a conduit in the shaft, and to a novel type of valve and associated transition casting for use with either disc or drum filters.

The provision of an economical design of center shaft for rotary vacuum disc filters has been a continuing problem of the industry. In the past, it has been common practice to provide cast sections with ports cast in. The sections are joined in the final assembly and considerable machining of components is required before assembly. The cast shaft stands wear well due to the heavy wall thickness of the cast in ports, but due to the ever increasing price of cast iron, such a shaft is now becoming uneconomical, particularly for small size filters.

Another difficulty has been experienced with fabricated shafts using circular tubes as conduits, in that the relatively thin wall tends to erode rapidly under the blast or downwardly directed nozzle effect of the filtrate and air-flow immediately under the sector where the sector bell connects to the shaft. In vacuum filter design, an effort is made to maintain velocities in the various drainage channels that will permit the air flow to sweep out residual filtrate. If the velocities are too low, there is a tendency for residual filtrate to be retained in the drainage channels. Then when the reverse pressure of "blow" comes on to discharge the cake, this residual filtrate is driven back into the cake and defeats the purpose of the filter which is to dewater the cake to the lowest possible filtrate or moisture content.

The present invention represents a significant departure from prior art practices in the construction and assembly of a hollow center shaft for vacuum disc filters. One of the innovations is the utilization of components of preformed shapes and dimensions which are available on the market and may be used in the assembly with only a minor amount of machining required to provide an efficient and durable assembly of reduced cost and shipping weight and incorporating improved hydraulics in directing fluid flow in and out of said shaft.

Another innovation of our invention is the provision of a novel type of connector for joining a sector bell passage with an interior passage of the shaft. This connector is a casting having a radius turn to the lengthwise axis of the interior passage, and preferably the passage in the castings has an increasing cross-section as it approaches the interior passage or is curved to prevent direction outflow, thereby lessening the blast effect of flow into said interior passage. By turning and expanding the flow, any erosion that results will occur within the connector which is easily replaced at low cost compared with interior tube replacement. Such casting also is suited for use as a replacement part in filters now having a right angle turn connection.

Still another innovation of this invention is to utilize outside welding procedure in the assembly. The exterior component of the assembly may be commercial pipe, such as steel pipe, plastic pipe or similarly shaped commercial tubing such as oil well casing tubes. The interior conduits comprise metallic or plastic pipe or tubing, preferably of oblong or rectangular section. When the exterior component is to be joined to an interior tubular member, alined openings are provided as by torch cutting, if metallic, so as to provide a relatively narrow gap between the oblong tube and the outer shaft which can receive an arc or gas weld from above, or when plastic components are used and similar openings are formed, the connection is made by heat welding from above.

Yet another innovation is the provision of a novel valve assembly in which pressure or blow connection of a bulk head type is adapted to go on either side of the valve chamber eliminating the need for right and left hand units. A transition casting is provided for association with the valve to reduce velocities and prevent erosion and blast out in the valve head. This valve and associated transition casting are suitable for use as drum filter components.

Accordingly, it is an object of our invention to provide a novel center shaft assembly for disc filters which is inexpensive, durable, resistant to erosion and lightweight and incorporates improved hydraulics in the controlled flow of fluid in and out of said shaft.

Another object of this invention is the provision of a simple, economical and efficient center shaft construction for disc filter assemblies which is formed from commercially available components and requires a minimum of special castings and machining in the assembly.

A further object of the invention is to provide novel flow control means and connections in a disc filter having a novel center shaft construction.

Still another object of our invention is to provide a novel combination of control valve and transition casting which is well adapted for use on both disc and drum filters.

Other objects reside in novel details of construction and novel combinations and arrangements of parts, all of which will be set forth in the course of the following description.

The practice of our invention will be described with reference to the accompanying drawings illustrating a typical center shaft construction and other structural assemblies utilizing novel features of our invention, and which may be produced in a variety of materials. In the drawings, in the several views of which like parts bear similar reference numerals, FIG. 1 is a partially broken side elevation view of a center shaft assembly according to our invention with broken areas shown in section to illustrate the shaping and arrangement of interior parts;

FIG. 2 is a sectional view taken along the line 2—2, FIG. 1, and appearing essentially as an end elevation of one filter sector supported by and connected to the center shaft shown in FIG. 1;

FIG. 3 is an end elevation view of one valve head shown in the FIG. 1 assembly;

FIG. 4 is a fragmentary partially broken end elevation view similar to FIG. 2 and drawn to an enlarged scale, showing details of the center shaft construction and sector mounting thereon in section;

FIG. 5 is a fragmentary section taken along the line 5—5, FIG. 4, and showing an arrangement for use of abrasion-resistant inserts in the bottom of the interior tubes of the shaft;

FIG. 6 is a fragmentary partially broken side elevation view similar to FIG. 4 and drawn to the scale of FIG. 4, showing cutting and welding details and the flow control of the casting utilized as the connector between a sector bell and an interior tube of the center shaft assembly;

FIG. 6A is a partially broken vertical section similar to FIG. 6 and showing a modified form of connector for directing blast discharge away from a direct flow onto the walls of an interior tube with which it is connected;

Figure 7:
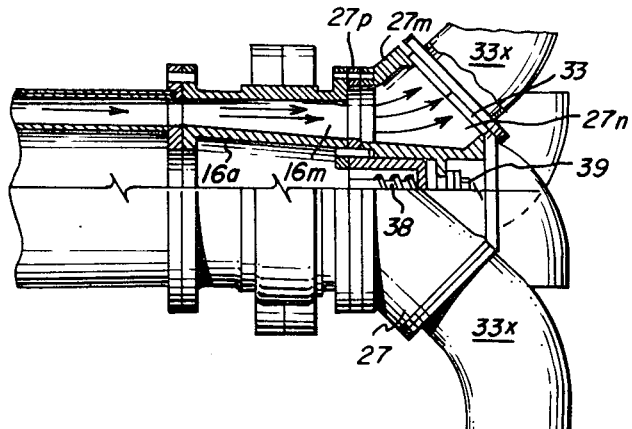
FIG. 7 is a side elevation view, partially in section of a transition casting and its connection with a valve head for reducing erosion effects to which the valve head is subjected.

The shaft assembly illustrated in FIG. 1 comprises an exterior component 15 which as shown is an elongated hollow body such as tubing, pipe or the like, preferably having its intermediate section 15a flanged at its ends for connection to flanged transition castings 16 and 16a which in turn are connected with valve heads at both ends as shown, or at least one end. When all the filter components are assembled, the center shaft will be horizontally disposed and suitably supported for rotation with a plurality of filter discs carried by the shaft being immersed in a slurry tank during a part of each revolution of the shaft and suitable discharge mechanism, such as scrapers, will remove formed cake from the disc surfaces through another portion of the revolution.

The tank, discharge mechanism and shaft mounting are not features of the present invention and have not been illustrated in detail. The sector assembly and fastening may be of any suitable type and as shown in FIG. 2 embody features of Ser. No. 651,344, filed June 19, 1967, for Disc Filter Sector Assembly and Separable Components Thereof, now U.S. Pat. No. 3,485,376 of Dec. 23, 1969. Bearings 18 and 19 support opposite ends of the shaft and bearing 18 is a part of a drive assembly for the shaft including gearing 20. Other supporting structure 21 is shown. While a plurality of discs will be supported lengthwise of the shaft, each comprising a plurality of sectors 22 in sequential arrangement circumferentially of the shaft, only one such sector has been shown in FIGS. 1 and 2 with another fragment of a sector bell 22x also shown in FIG. 1, and additional illustration is considered unnecessary.

The shaft assembly includes a plurality of conduit members 23 in circumferentially spaced arrangement interiorly of the exterior component 15 of the shaft, each such conduit member being in conductive communication with a sector bell 22x and ports 24 and 25 of a pair of valve heads 26 and 27 mounted on opposite ends of the shaft. Usually the conduit members 23 are other than round, preferably being of oblong or rectangular section, and may be available commercial tubing having the desired shape and dimension including round. In the assembly illustrated in FIG. 1, the intermediate section 15a of the outer component comprises a major part of the total length of the shaft and will carry all of the discs and sectors of the assembly.

A convenient arrangement for interior conduit and exterior sector support has been provided and is illustrated in FIG. 1, which is representative of a 10-disc filter with double ended valve assembly and metallic shaft components. A novel type of turn flow casting 17 has been utilized which turns the flow towards the associated valve and in the 10-disc arrangement five of said castings are directed toward valve 27 and the other five are directed toward valve 26 at the drive end. These castings permit torch cutting rectangular openings 28 through the wall of intermediate section 15a where each supported sector is to be mounted and an exterior welded connection is made between section 15a, the conduit members 23 and the turn flow castings 17 as best shown in FIGS. 4, 5 and 6.

Castings 17 not only prevent direct blast effect but also provide a connecting passage 17a with a radius turn to the lengthwise axis of the connected conduit member 23 which turns and expands the flow so that any erosion of consequence takes place within the casting. The castings are easily replaced when they eventually become worn. A great deal of the turbulence of the right angle turn of conventional connections is avoided and a reduction in pressure drop is obtained. When the rectangular openings 28 are cut in intermediate section 15a, the section modulus is reduced by about 50 percent but this is replaced with oblong or rectangular components that have a relatively high section modulus due to their shape.

In addition to their utilization as components of the novel shaft assembly shown in FIG. 1, the castings 17 may be installed in prior art cast iron shafts of previously installed equipment which is still operational to prevent erosion of the right angle connection previously provided, and better hydraulics also are attained because of such modification. As shown in FIG. 6, castings 17 have a depending portion 17x which projects downwardly into the welded opening and thereby provides protection for the welded seams against the scouring action of the flow.

A modified form of transflow casting has been shown in FIG. 6A. This casting 57 has a connecting passage 57a extending from an upper recess portion to a bottom discharge outlet defined by a flanged depending portion 57x. Passage 57a is curved sufficiently so that the top opening of said passage is within the vertical plane of the lower curved wall 57z and this curved portion provides protection against blast effect from the associated sector passing directly onto a wall of the associated interior conduit member 23 with which it is connected, as all flow in direct descent impinges on the curved surface 57z and is directed forwardly into the conduit members 23 due to the change in direction.

When the flow approaches the valve heads 26 and 27, the velocity is reduced by the transition casting 16 or 16a which provides a passage of increasing cross section in the direction of the valve. The expansion of the flow reduces its velocity and greatly diminishes the erosion and blast out in the valve head. Other features of the construction and functioning of the valves 26 and 27 not shown in detail in FIG. 1 have been illustrated in other views of the drawings and will be described hereinafter.

It will be apparent from the illustration of the hollow center shaft construction shown in FIG. 1 and the preceding description relating thereto that such an assembly substantially eliminates the need for special patterns, as the main shaft components, particularly those shown in intermediate section 15a comprise an outer component which may be formed of tubing or pipe and preferably is cylindrical. The wall thickness of said member only requires that it provide sufficient strength to support the interior components and the number of discs mounted on its exterior surface which are required for a given assembly. The interior passages are formed by tubular components and are supported from the exterior component usually by welding.

The shaping of the exterior component and the inner tubular members particularly in cross section may be selected to meet both strength and durability requirements, as well as providing improved hydraulics in the flow of the fluid in and out of the shaft. Where the dimensional requirements permit the use of available industrial materials, as, for example, steel or plastic pipe for use as the outer component, it is only necessary in a given assembly to cut the pipe sections to the desired length, secure flanges on the ends where flanges are not otherwise provided and then cut the tubular members for the interior assembly to the desired length. Such members preferably are other than round in section and for best effects rectangular or oblong sections are utilized. Such members may be formed from relatively thin material particularly when an insert member is provided to protect the bottom surface from blast effect from the associated filter sector.

Openings 28 are formed in the wall of the exterior component as by torch cutting when metal tubing or pipe is used or forming similar openings in plastic pipe, after which the turnflow castings are fitted in the openings so formed in the exterior component and also in the tubular conduits and the components are connected as by electric arc or gas welding for metallic assemblies and heat welding for plastic assemblies. Consequently, the only patterns required are for the turn-flow castings 17 and the transition castings 16 and 16a adjoining the valves 26 and 27, and only a minimum of machining is required to complete a given shaft. The shaft when so assembled is greatly reduced in weight without sacrificing durability and the principal wear occurs on component parts which are easily replaced at low cost when necessary.

Figure 9:
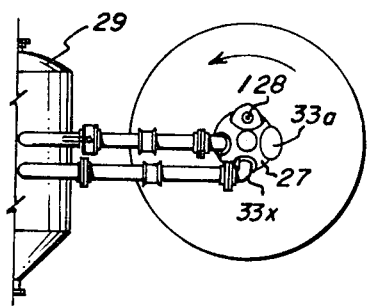
FIG. 9 is an end elevation of the valve head end of the center shaft assembly as shown in FIG. 1 and drawn to a reduced scale to illustrate a lefthand connection to an associated vacuum receiver.

A novel feature of the valve assembly 27 shown in FIGS. 1 and 3 is the provision of a blow connection which is on the vertical center line as viewed in FIG. 3. Frequently, in plant layout, it will be advantageous to have the vacuum receiver on only one side of the filter. The blow connection 128 shown in FIG. 3 is a bulkhead type, i.e., it is fabricated rather than cast into the valve head 27 and can go to either side of the valve chamber 27, depending on the hand of the valve which is required. Such arrangement is not only advantageous in the layout by being able to locate the receiver 29 on either side of the filter as shown in FIGS. 9 and 11, but in addition a triple connection can be provided as shown at 30 in FIG. 10. In the latter arrangement, a very high volume of air flow will be handled by the double connection to the drying zone of the filter. Thus, only one pattern is required for both left and righthand valve heads. Openings 33 in valve head 27 which are not connected are closed by a suitable plug 33a (FIG. 1).

A preferred arrangement for assembly of the tubular conduits 23 interiorly of the outer component 15a and the use of the connectors or turn-flow castings 17 for conducting flow from and into the sector bells 22x will now be described with reference to FIGS. 4, 5 and 6. As shown in FIG. 4, the outer component 15a of the shaft has flanged end portions 30, each having a series of circumferentially spaced openings 30a for interconnection with similar flanged portions 16x on the transition castings 16 and 16a as by bolting. A suitable number of openings 28 are formed circumferentially of outer component 15a in rows spaced lengthwise of said component to seat the required number of sectors 22 forming each disc and the required number of discs. By using rectangular tubing for conduits 23, a relatively narrow gap 31 is established between opening 28 and conduit 23 which can receive an arc weld 32 without too much bleedout or additional welding. Also, to further reduce erosion of conduits from blast effect, abrasion-resistant strips 34 may be fitted against the bottom wall 23a of the tubular conduits 23.

Also as shown in FIG. 6, casting 17 is made to permit depending portion 17x to project downwardly into the opening 28 and thereby provides protection for the welded seams against the scouring action of the flow. Casting 17 may be held in place and sealed against outer component 15a by a rectangular gasket 35 and tightened by the half nuts 36x on the radial rods 37 cooperating with nuts 36.

Valves 26 and 27 shown in FIGS. 1, 3, 7 and 8 are structural and functional equivalents and have been given different reference numerals to designate their left and righthand positions as viewed in FIG. 1. Valve 27, for example, has a cone surface 27m of about 45° and valve 26 is similarly shaped. The openings 33 are formed on this conical surface (FIG. 3) and the snout connections 33x are of relatively short length, giving a good functional appearance and effect. The spring 38 (FIGS. 1 and 7) is used to exert pressure on the valve head until it is seated and then the vacuum holds the valve faces tightly together. The stem or threaded bolt 39 turns with the shaft. The spring is stationary against the valve head and a thrust bearing (not shown) lets the stem rotate against the stationary spring.

Figure 8:
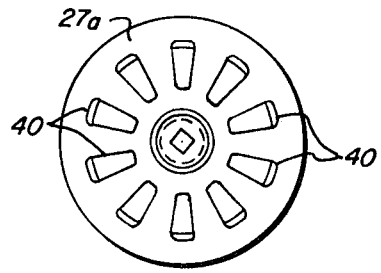
FIG. 8 is an end elevation or plan view of the wear plate port arrangement included in the transition assembly shown in FIG. 7.

FIG. 8 shows a wear plate 27p of the type used in an assembly such as shown in FIG. 7 wherein said wear plate is fitted onto the flanged end of transition casting 16a and has a series of elongated radial ports 40 in circumferentially spaced arrangement which aline with the passages 16m in the transition casting and although causing some restriction of the passage direct the expanding flow into another expanding passage 27n within valve 27 as indicated by the expanding arrow pattern in FIG. 7. This arrangement reduces incoming flow velocity and prevents erosion and blast-out in the valve head.

Figure 12:
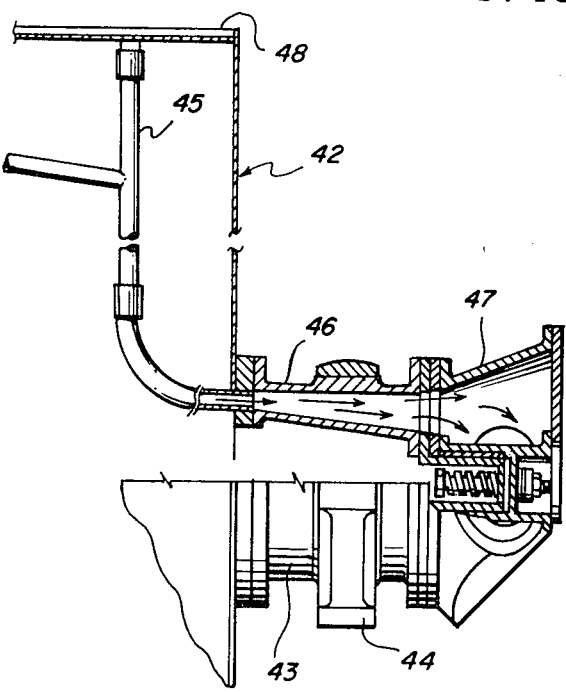
FIG. 12 is a vertical fragmentary section of a valve and associated transition casting mounted on a rotary drum and illustrating the increasing cross section passage arrangement of such an installation.
Figure 13:
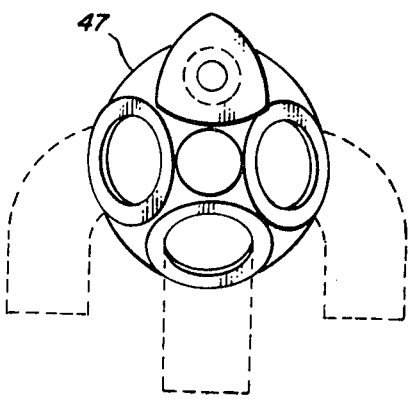
FIG. 13 is an end elevation of the valve shown in FIG. 12 illustrating a triple connection with a vacuum receiver by dash line representation.

As mentioned in the earlier description, a combination of a valve, such as valve 27, and a transition casting, such as 16a, are well suited for controlling pressure flow in a drum filter installation in the manner illustrated in FIGS. 12 and 13. The drum filter is shown at 42 as having a central trunnion 43 supported for rotation in a bearing assembly 44 with piping connections 45 extending from its peripheral filtering surface 48 to the inlet end of a transition casting 46, the opposite end of which connects to a valve 47. Except for minor dimensional differences, casting 46 is the same as casting 16a and valve 47 is the same as valve 27 previously described.

Figure 10:
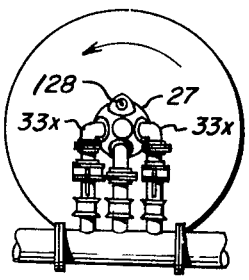
FIG. 10 is an end elevation similar to FIG. 9 and illustrating a triple connection with a vacuum receiver which may be provided.
Figure 11:
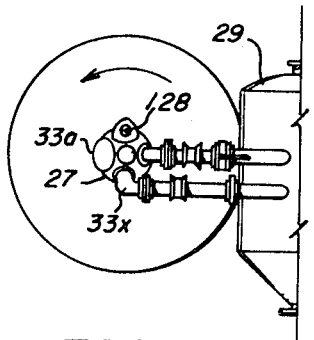
FIG. 11 is another end elevation similar to FIG. 9 and illustrating a righthand connection to the vacuum receiver.

FIG. 13 illustrates valve 47 as having a triple connection with a vacuum receiver (not shown) which is similar to the arrangement shown in FIG. 10. Such an arrangement permits location of the receiver on whichever side of the filter best suits the requirements of the plant layout. The passage arrangement of casting 46 and valve 47 effectively reduces flow velocity and prevents erosion within the valve head.

We claim:

1. In a disc filter assembly in which a plurality of filter discs are mounted on a common shaft for rotation therewith to selectively dispose disc surfaces under vacuum influence in a confined body of slurry through a portion of said rotation and to discharge formed cake from said surfaces by pressure change on said surfaces through another portion of said rotation, each said disc comprising a plurality of sectors in sequential arrangement circumferentially of the shaft, and valve means associated with said shaft for selectively applying vacuum and pressure to each sector during each revolution of the shaft, the improvement which comprises a hollow center shaft fabricated from pre-formed industrial components, inclusive of a hollow tubular body forming the exterior component of the shaft and a plurality of tubular members disposed in circumferentially spaced relation interiorly of the exterior component, each said tubular member providing a conductive passage in communication with at least one sector for applying vacuum and pressure thereto under control of a filter valve, and said tubular members welded to said exterior component for providing a structural assembly to support the discs and transmit torque thereto during rotation of said shaft.

2. A disc filter assembly as defined in claim 1, in which the tubular body is steel pipe.

3. A disc filter assembly as defined in claim 1, in which the tubular body is plastic pipe.

4. A disc filter assembly as defined in claim 1, in which the welded connections between the tubular members and the exterior component are disposed below surface openings of said exterior component.

5. A disc filter assembly as defined in claim 1, in which connecting means are disposed between a tubular member in the shaft assembly and an associated sector, said connecting means having a connecting passage with a radius turn to the lengthwise axis of said member.

6. A disc filter assembly as defined in claim 1, in which the connecting passage is of increasing volume approaching the tubular member.

7. A disc filter assembly as defined in claim 1, in which the connecting passage is of increasing cross section approaching the tubular member.

8. A disc filter assembly as defined in claim 1, in which connecting means are disposed between a conduit of oblong section in the shaft and an associated sector, said connecting means having a connecting passage at an oblique angle to the lengthwise axis of said conduit.

9. In a disc filter assembly in which a plurality of filter discs are mounted on a common shaft for rotation therewith to selectively dispose disc surfaces under vacuum influence in a confined body of slurry through a portion of said rotation and to discharge formed cake from said surfaces by pressure change on said surfaces through another portion of said rotation, each said disc comprising a plurality of sectors in sequential arrangement circumferentially of the shaft, and valve means associated with said shaft for selectively applying vacuum and pressure to each sector during each revolution of the shaft, the improvement which comprises a hollow center shaft inclusive of metal tube forming the exterior component of the shaft and a plurality of metallic tubular members of a section other than round disposed in circumferentially spaced relation interiorly of the outer tube and with a small gap between adjoining surfaces of the tubular members and the tube, each said tubular member providing a conductive passage in communication with at least one sector for applying vacuum and pressure thereto under control of a filter valve, and said tubular members welded to said metal tube at the gap for support by said tube during rotation of said shaft.

10. A disc filter assembly as defined in claim 9, in which the tubular members are of oblong section.

11. In a filter assembly having a hollow body including at least one filter medium surface and mounted on a shaft for rotation therewith to selectively dispose the filter medium surface under vacuum influence in a confined body of slurry through a portion of said rotation and to discharge formed cake from the filter medium surface by pressure change on said surface through another portion of said rotation, and valve means associated with said shaft for selectively applying vacuum and pressure to the filter medium surface during each revolution of the shaft, the improvement which comprises a hollow center shaft having a plurality of tubular members disposed in circumferentially spaced relation interiorly of the shaft, each said tubular member providing a conductive passage in communication with a filtrate conduit disposed between the filter medium surface and said shaft for applying vacuum and pressure to said surface under control of a filter valve, and said valve having a valve head with a blow connection that extends from a vertical center line on the exterior surface of the valve head to either side of said center line in the internal chamber enclosed by said valve head.

12. In a filter assembly having a hollow body including at least one filter medium surface and mounted on a shaft for rotation therewith to selectively dispose the filter medium surface under vacuum influence in a confined body of slurry through a portion of said rotation and to discharge formed cake from the filter medium surface by pressure change on said surface through another portion of said rotation, and valve means associated with said shaft for selectively applying vacuum and pressure to the filter medium surface during each revolution of the shaft, the improvement which comprises a hollow center shaft having a plurality of tubular members disposed in circumferentially spaced relation interiorly of the shaft, each said tubular member providing a conductive passage in communication with a filtrate conduit disposed between the filter medium surface and said shaft for applying vacuum and pressure to said surface under control of a filter valve, inclusive of a plurality of circumferentially spaced port openings for selective connection of at least two openings with a vacuum receiver on a selected side of a vertical center line, and means for closing the openings not so connected.

* * * * *